Oct. 11, 1960 G. J. SCHWARTZ ET AL 2,955,471
LIQUID ENERGY TRANSFER APPARATUS
Filed April 19, 1954 2 Sheets-Sheet 1
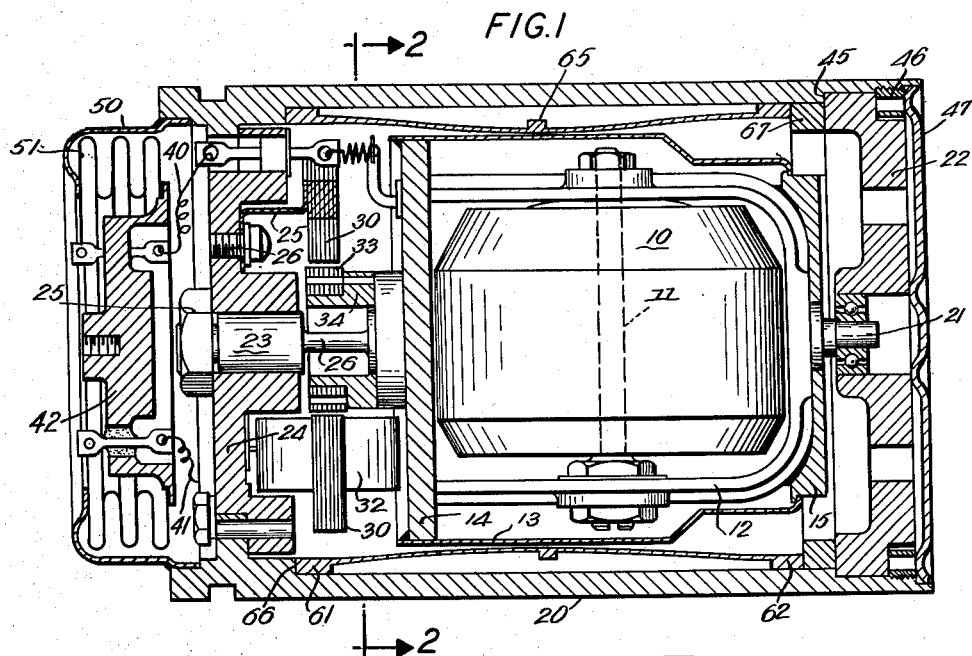
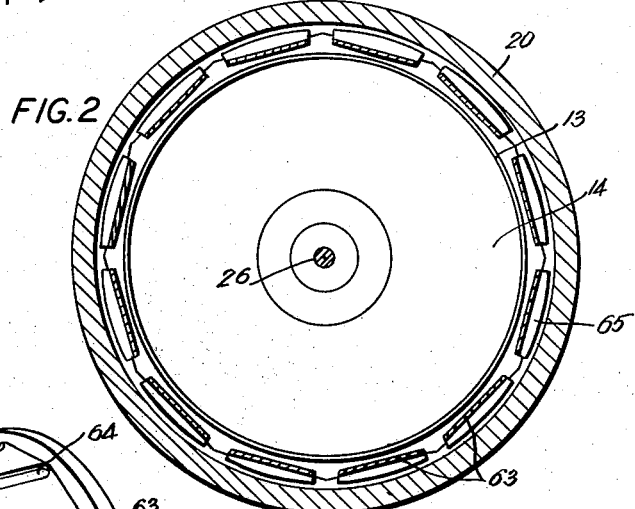
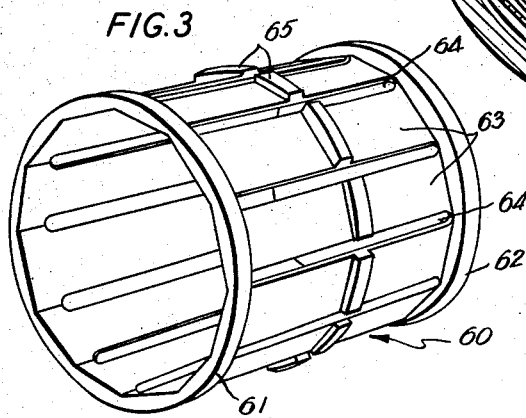
INVENTORS
GEORGE J. SCHWARTZ
ALAN M. CAMPBELL
BY R W Furlong
ATTORNEY.

Oct. 11, 1960 G. J. SCHWARTZ ET AL 2,955,471
LIQUID ENERGY TRANSFER APPARATUS
Filed April 19, 1954 2 Sheets-Sheet 2

INVENTORS
GEORGE J. SCHWARTZ
ALAN M. CAMPBELL
BY R.W. Furlong
ATTORNEY

United States Patent Office

2,955,471
Patented Oct. 11, 1960

2,955,471

LIQUID ENERGY TRANSFER APPARATUS

George J. Schwartz, Newtonville, and Alan M. Campbell, Weston, Mass., assignors, by mesne assignments, to Minneapolis-Honeywell Regulator Company, a corporation of Delaware Filed Apr. 19, 1954, Ser. No. 423,953

7 Claims. (Cl. 74—5.5)

This invention relates to apparatus for the transfer of energy through a liquid medium and pertains more specifically to an improved liquid damping mechanism and liquid drive mechanism having an automatic adjustment to compensate for variation in viscosity of the liquid with changes in temperature.

One object of the invention is to provide a device of the class described having automatic adjustment means which compensates at least in part for variations in the viscosity of the liquid with changes in temperature.

Another object is to provide a device for the transfer of energy through a liquid medium by subjecting a viscous liquid to shearing action between closely spaced surfaces moving generally parallel to each other, which device includes means for automatically varying the clearance between the surfaces in response to temperature change to compensate at least in part for changes in viscosity of the liquid.

A further object is to provide a liquid damping device for damping mechanical movement which is particularly useful in devices for measuring motion with respect to inertial space, such as gyroscopes and accelerometers, as well as in servo-motors and in position measuring devices such as synchros, microsyns, etc.

A further object is to provide a liquid damping device for damping mechanical movement in which a thin film of liquid is subjected to shearing stress, the device including means for automatically reducing the thickness of the liquid film upon increase in temperature to compensate at least in part for decrease in the viscosity of the liquid with increase in temperature.

Another object is to provide a liquid drive mechanism of the type in which a thin film of viscous liquid is subjected to shearing stress between relatively moving surfaces of a driving member and a driven member, which mechanism includes automatic temperature responsive means for varying the spacing between the surfaces to compensate at least in part for changes in viscosity of the liquid upon change in temperature.

Still a further object is to provide apparatus of the class described in which a film of viscous liquid is subjected to shearing stress between a pair of nested cylindrical members rotating with respect to each other about the same axis, together with means for automatically varying the effective diameter of one or both of the cylindrical members upon change in temperature to compensate at least in part for changes in viscosity of the liquid.

Other and further objects will be apparent from the drawings and from the description which follows.

In the case of liquid damping devices in which a liquid medium is employed to damp out oscillations or undesired mechanical movement, as well as in the case of liquid drive mechanisms in which the liquid serves for the transmission of driving force from the moving drive member to the driven member, one of the problems which is encountered is that of variation in effectiveness or efficiency when the temperature at which the apparatus operates is changed. While there have been improvements in the properties of the oils or other viscous liquids employed as the liquid media in such devices in an effort to minimize changes in viscosity of such liquids upon changes in temperature, even the best of such materials now available is subject to an undesirably large variation in viscosity over a moderate temperature range. For example, some of the silicone oils or liquids which are generally considered to be the most satisfactory for this purpose exhibit a tenfold decrease in viscosity from −30° F. to 150° F. In some cases, temperature ranges even wider than this may be encountered under service conditions, with consequent greater variation in viscosity.

The effective torque between two nested cylindrical surfaces, one of which rotates with respect to the other about their common axis, may be expressed by the following equation in which C equals torque/radian/second; r equals outside radius of inner cylinder; l equals length of shorter cylinder, μ equals absolute viscosity of liquid between cylinders; and Δr equals the gap between cylinders where Δr is very small with respect to r.

$$C = \frac{2\pi r^3 l \mu}{\Delta r}$$

From the foregoing equation, it is clear that the effective torque is directly proportional to the viscosity of the liquid, from which it follows that a tenfold change in viscosity over a given temperature range will result in a tenfold change in torque, other factors remaining constant.

The device of the present invention includes means for automatically varying the gap between the moving surfaces (expressed as Δr in the specific case defined in the preceding paragraph) upon changes in temperature. Since the effective torque is inversely proportional to the gap (Δr), it follows that any increase in torque caused by increase in viscosity (μ) may be offset or compensated for by a corresponding increase in gap (Δr).

There are illustrated in the drawings two embodiments of the present invention which are given by way of illustration and are not intended as a limitation upon the scope of the invention.

Referring to the drawings:

Fig. 1 is a view in longitudinal section of a gyroscope having a liquid damping mechanism embodying the present invention;

Fig. 2 is a sectional view taken along the line 2—2 of Fig. 1;

Fig. 3 is an isometric view of a hollow cylindrical member having a variable effective diameter which forms a part of the device shown in Fig. 1.

Figure 4:
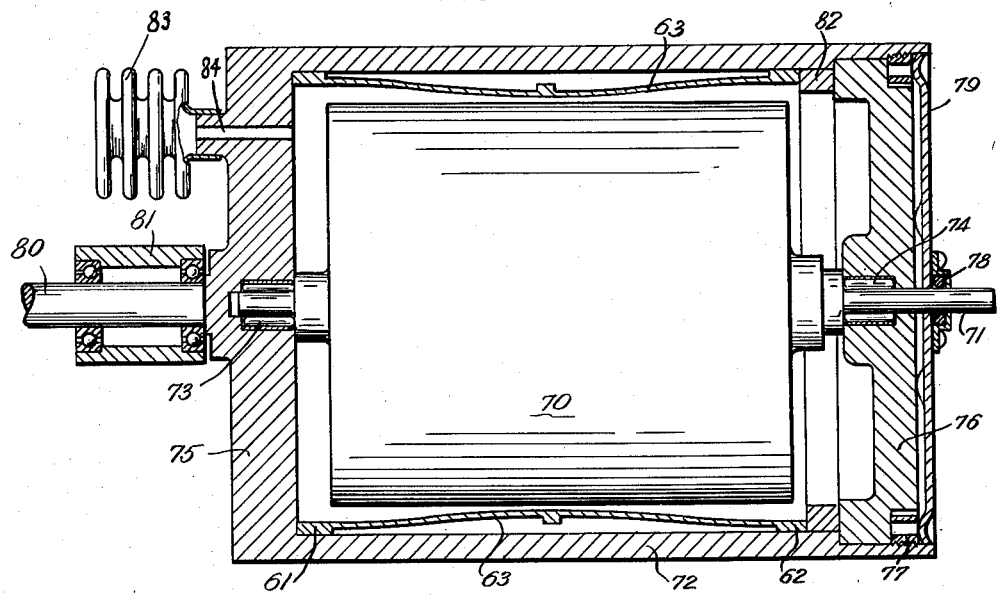
Fig. 4 is a view in longitudinal section of a liquid drive mechanism embodying the present invention.

Referring to Fig. 1, the gyroscope includes a conventional gyro-motor 10 comprising a stator and rotor mounted upon a shaft 11 secured at opposite ends to gimbal frame 12. This whole assembly is enclosed within a generally cylindrical housing 13 closed at each end by end plates 14 and 15, to which the gimbal frame is secured. Housing 13, together with its enclosed gyro-motor assembly, is mounted within an outer cylindrical liquid-filled casing 20, being supported at one end by stub shaft 21 journaled in end plate 22 of casing 20 and at the other end by means of tapered shaft 23 seated in end wall 24 by means of nut 25. The shaft between the tapered portion 23 and end plate 14 of inner housing 13 includes a necked-down portion 26 which acts as a torsional spring permitting slight rotation or twisting along its length. The axis of necked-down portion 26 coincides with the precession axis of the gyro-motor. A suitable electromagnetic detection unit, consisting of laminated core member 30 provided with winding 32, is mounted on end wall 24 by means of brackets 25 and bolts 26. This detection unit is arranged to cooperate with a corresponding laminated armature 33 mounted upon a sleeve 34 secured to end plate 14 and extending outwardly therefrom around torsion spring member 26.

As will be seen from the foregoing description, core member 30 is fixed to end wall 24 of outer casing 20 while armature 33 is fixed to and rotatable with inner housing 13 about the precession of axis of gyro-motor 10 as torsion spring 26 twists about its axis. A source of energy for energizing the gyro-motor, as well as means for detecting the extent of rotation of armature 33 with respect to core member 30 may be connected to a plurality of suitable leads 40, 41 which extends through closure member 42 and are sealed thereto.

End plate 22 of outer casing 20 rests on an internal shoulder 45 of casing 20, being held thereagainst by lock ring 46 threaded into casing 20. Sealing cover 47 is hermetically sealed to housing 20 around its margin to prevent leakage of liquid from the interior.

The opposite end of outer casing 20 includes a bellows housing 50 sealed to casing 20 at one end and serving to support a thin-walled, flexible, metallic bellows member 51 which is sealed to bellows housing 50 at one margin and to closure member 42 at its other margin. The flexibility of bellows member 51 permits movement of closure member 42 toward and away from end wall 24 to allow for expansion and contraction of the liquid contained within housing 20 upon changes in temperature. The entire free space between outer casing 20 and inner housing 13 from end closure 42 to sealing cover 47 is filled with any suitable damping liquid, such as silicone oil.

Disposed within outer casing 20 between it and inner housing 13 is a generally cylindrical member 60 coaxial with outer casing 20 and having annular end members 61, 62 connected by a plurality of slats or staves 63, 63 separated by slots 64, 64, each stave 63 being provided with an outwardly projecting stop 65 midway between its ends. Cylindrical member 60 is mounted with one annular end member 61 bearing against an internal shoulder 66 of outer casing 20, the other annular end member being seated against spacer ring 67, which in turn bears against end plate 22, member 60 being thus secured by frictional engagement against rotation with respect to outer casing 20. The thickness of stop members 65 is somewhat greater than that of annular end members 61, 62 so that when stops 65 are resting against the cylindrical inner face of outer casing 20, staves 63 are bowed slightly inwardly.

The extent of the inward bowing of staves 63 at the temperature at which the device is assembled (normally room temperature) may be adjusted by varying the thickness of spacer ring 67 as desired. The extent of bowing, of course, determines the clearance between staves 63 and inner housing 13.

The material from which cylindrical member 60 is made is a material having a high coefficient of expansion with temperature, such as aluminum, magnesium, brass, zinc, alloy, etc., or a suitable non-metallic material such as a plastic, glass fiber laminate, etc. The material from which outer casing 20 is made, on the other hand, is a material having a low coefficient of expansion, such as a nickel-iron alloy known as Invar. By a proper choice of the materials for casing 20 and cylindrical member 60, combinations can be obtained in which the rate of change in extent of bowing of slat members 63 upon change in temperature can be adjusted to various desired values.

In operation of the device, increase of the ambient temperature, which causes an increase in temperature of the liquid contained between casing 20 and inner housing 13, results in a decrease in the viscosity of the liquid; at the same time, by reason of the greater expansion of cylindrical member 60 than of outer casing 20, staves 63 are bowed inwardly to an increasing extent as shown in Fig. 1, thereby reducing the effective distance or gap between staves 63 and cylindrical inner housing 13. This decrease in gap tends to compensate for the concomitant decrease in viscosity of the liquid medium for the reasons pointed out hereinabove, thus tending to maintain constant the effective torque/radian/second between inner housing 13 and the staves 63 which are secured to outer casing 20. By proper selection of the damping liquid and of the materials from which cylindrical member 60 and outer casing 20 are constructed, it is possible to provide a device in which the effective damping torque varies by as ltitle as 3 to 1 or even less within a given temperature range, while the viscosity of the damping liquid itself varies by 10 to 1 or more over the same range.

The principle of the invention can also be applied to a liquid drive mechanism, one embodiment of which is shown in Fig. 4. In this device a cylindrical driving member 70 is secured to shaft 71 to which power is supplied from any suitable source (not shown). Driving member 70 is enclosed within a generally cylindrical driven member 72 being supported therefrom at opposite ends by means of needle bearings 73, 74, bearing 73 being mounted in end wall 75 of driven member 72 and bearing 74 being mounted in end plate 76 which is secured to driven member 72 by means of locking ring 77. The free space between driving member 70 and driven member 72 is filled with a suitable viscous liquid such as a silicone oil. Driven member 72 is hermetically sealed to prevent leakage of the oil by means of O-ring 78 and seal plate 79, and is provided with a bellows expansion chamber 83 communicating with the interior of member 72 through passageway 84 to allow for expansion and contraction of the liquid with change in temperature. Driven member 72 is secured to shaft 80 journaled in any suitable bearings 81. Mounted within driven member 72 coaxially therewith and secured thereto is a slotted cylindrical member, identical with that shown in Fig. 3, having staves 63, 63 connecting annular end members 61, 62. As in the case of the embodiment shown in Fig. 1, the staves 63 are bowed inwardly to any desired extent by means of spacer ring 82; and by proper choice of the material from which staves 63 and driven member 72 are constructed, any desired rate of increase or decrease in bowing with change in temperature can be obtained. This means that any desired rate of change of the effective gap between staves 63 and the cylindrical surface of driving member 70 can be achieved, thus compensating to any desired extent for changes in viscosity of the liquid medium with changes in temperature.

The device shown in Fig. 4, of course, is equally effective when driven in reverse; that is, cylindrical member 70 may be the driven member and member 72 may be the driving member.

Although we have herein described specific embodiments of our invention, we do not intend to limit ourselves solely thereto, but to include all of the obvious variations and modifications within the spirit and scope of the appended claims.

We claim:

1. Apparatus comprising a liquid-containing member, a movable member immersed in said liquid in spaced relation with said liquid containing member for transfer of energy to and from said movable member and said liquid, and means for automatically compensating at least partially for changes in viscosity of the liquid due to temperature changes including an element secured at its extremities to one of said members and positioned between opposing faces of said members, the coefficient of expansion of said element being different from the coefficient of expansion of the member to which it is secured to cause a change in position of said element with respect to said members upon change in temperature to vary the clearance between said element and said members.

2. A gyroscope comprising spaced inner and outer housings having a damping liquid disposed therebetween, a gyro-motor mounted within said inner housing and secured thereto for movement of said housing with precession of said motor, and means for automatically varying the effective clearance between said inner and outer housings to compensate at least partially for change in the viscosity of said liquid with change in temperature, said means including a temperature-responsive element secured at its extremities to one of said housings and disposed between adjacent portions of said housings.

3. A liquid-damped gyroscope comprising inner and outer coaxial cylindrical housings having a liquid-filled clearance space therebetween, a gyro-motor mounted within said inner housing for precession of the inner housing together with the motor about the axis of the housing, a generally cylindrical sleeve member disposed in said clearance space having its ends secured to said outer housing, said sleeve member including a plurality of laterally spaced staves normally slightly bowed longitudinally inwardly toward the inner housing, the coefficient of expansion of said staves being greater than that of said outer housing to provide for increased bowing to reduce the clearance between said staves and said inner housing upon increase in temperature.

4. A liquid-damped gyroscope comprising a gyro-motor mounted within a generally cylindrical housing for precession of said motor together with said housing about the axis of the housing, a generally cylindrical outer casing coaxially enclosing said housing with a clearance between opposing cylindrical walls of said housing and casing, said outer casing being adapted to contain a damping liquid filling the space between said housing and casing, and means for automatically varying the clearance between said housing and casing in response to temperature change, said means including a false wall disposed between said opposing cylindrical walls, said false wall being normally slightly bowed longitudinally inwardly toward said housing and having its ends secured to said casing to cause increase of said bowing and decrease of the clearance between said false wall and said housing upon increase in temperature.

5. A liquid power transmission device comprising a driving member and a driven member mounted in spaced relation for rotation about a single axis, said members being in the form of a pair of nested cylinders having a clearace between opposing cylindrical faces, the axis of each cylinder coinciding with the axis of rotation, means for maintaining a liquid between said opposing cylindrical faces, and means for automatically varying said clearance in response to temperature changes including a false wall interposed between the opposing cylindrical faces, said false wall being normally slightly bowed longitudinally of said cylinders and having its ends secured to one of said members to cause increase of said bowing and decrease of the clearance between said false wall and the other of said members upon increase in temperature.

6. A liquid power transmission device as defined in claim 5 wherein said false wall comprises a plurality of laterally spaced staves connected at their extremities to a pair of annular end members and positioned in a generally cylindrical array, each of said end members being secured to the outer one of said nested cylinders such that the staves are bowed inwardly along their length toward the inner cylinder.

7. A liquid power transmission device comprising a driving member and a driven member mounted in spaced relation, one of said members being in the form of a hollow liquid-filled chamber mounted for rotation about an axis and the other being in the form of a rotor immersed in said liquid and mounted for rotation about the same axis, and means for automatically varying the clearance between the peripheral face of said rotor and the opposing face of said chamber upon changes in temperature of said liquid to compensate at least partially for changes in viscosity of said liquid, said means including a temperature-responsive element secured at its extremities to one of said members to form the face of said one of said members and positioned adjacent said face of the other of said members for movement toward and away from the same upon changes in temperature.

References Cited in the file of this patent

UNITED STATES PATENTS

| | | |
|---|---|---|
| 1,761,694 | Sweet | June 3, 1930 |
| 2,013,109 | Reynolds | Sept. 3, 1935 |
| 2,046,723 | Brownscombe | July 7, 1936 |
| 2,291,612 | Draper | Aug. 4, 1942 |
| 2,690,014 | Draper et al. | Sept. 28, 1954 |
| 2,718,149 | Bamford et al. | Sept. 20, 1955 |